(12) United States Patent
Nishina et al.

(10) Patent No.: US 8,528,010 B2
(45) Date of Patent: Sep. 3, 2013

(54) OPTICAL DISC APPARATUS

(75) Inventors: Yasuhiro Nishina, Osaka (JP);
Takayuki Murakami, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 0 days.

(21) Appl. No.: 13/432,307

(22) Filed: Mar. 28, 2012

(65) Prior Publication Data
US 2012/0275288 A1 Nov. 1, 2012

(30) Foreign Application Priority Data

Apr. 27, 2011 (JP) .................................. 2011-099155

(51) Int. Cl.
*G11B 7/00* (2006.01)
(52) U.S. Cl.
USPC .......................................................... 720/672
(58) Field of Classification Search
None
See application file for complete search history.

(56) References Cited

U.S. PATENT DOCUMENTS

| 6,922,840 B2 * | 7/2005 | Fujibayashi et al. .......... 720/675 |
| 2002/0136140 A1 * | 9/2002 | Arase ............................ 369/75.2 |
| 2005/0289575 A1 * | 12/2005 | Makara et al. ................ 720/652 |

FOREIGN PATENT DOCUMENTS

JP 2008-186560 8/2008

* cited by examiner

*Primary Examiner* — Wayne Young
*Assistant Examiner* — Brian Butcher
(74) *Attorney, Agent, or Firm* — Morgan, Lewis & Bockius LLP

(57) ABSTRACT

An optical disc apparatus includes: a chassis; an optical pickup that is movably disposed on the chassis; a flexible member including wiring, which extends out from the optical pickup; and a wall portion that is provided in a standing manner at one end portion of the chassis. In the optical disc apparatus, an opening that allows the flexible member to be disposed in a bent state is formed through the chassis, and a first cutout is formed at the wall portion so as to be continuous with the opening.

5 Claims, 6 Drawing Sheets

(Outer peripheral side)   (Inner peripheral side)

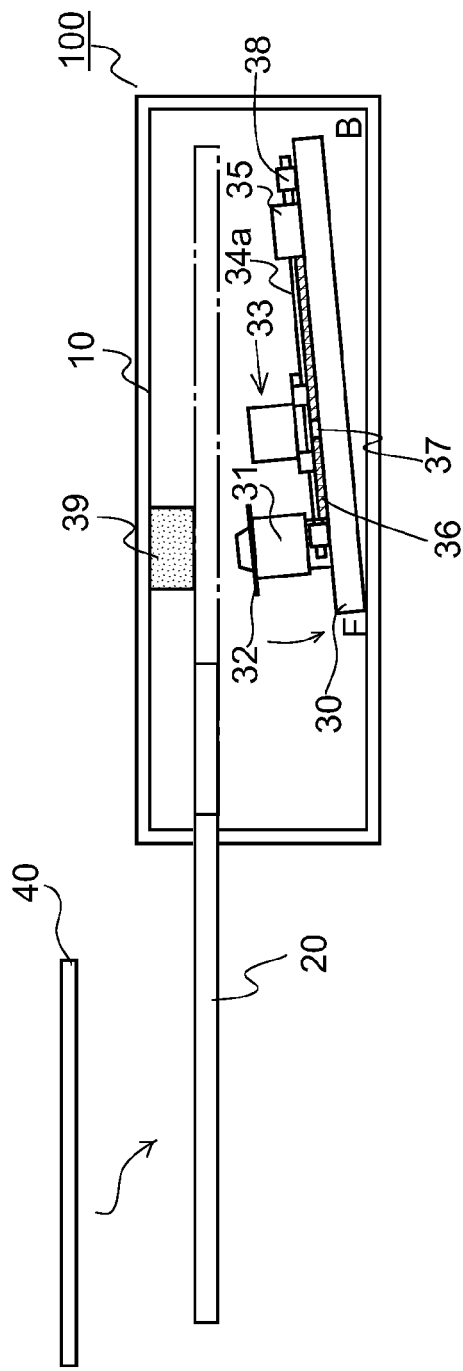
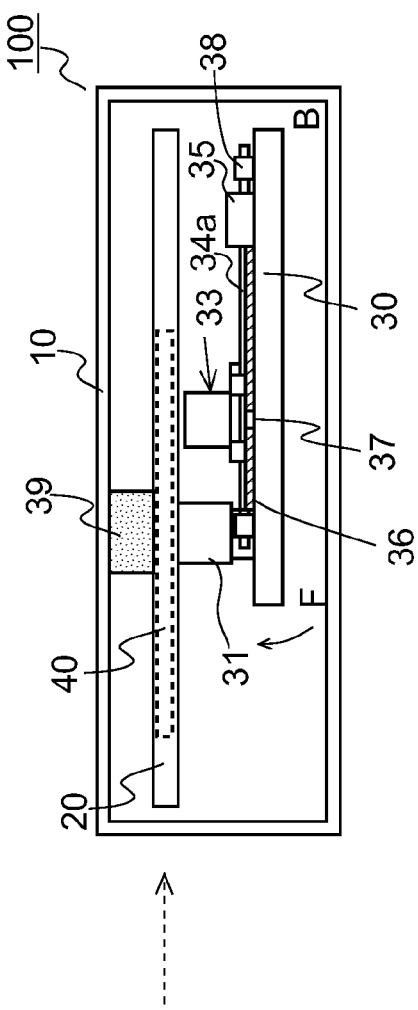
FIG.8A  RELATED ART
FIG.8B  RELATED ART

OPTICAL DISC APPARATUS

This application is based on Japanese Patent Application No. 2011-099155 filed on Apr. 27, 2011, the contents of which are hereby incorporated by reference.

BACKGROUND OF THE INVENTION

1. Field of the Invention

The present invention relates to an optical disc apparatus that is used to reproduce information recorded on an optical disc and/or to record information on an optical disc.

2. Description of Related Art

Conventionally, an optical disc apparatus has been used to reproduce information recorded on an optical disc such as a Blu-ray disc (hereinafter, abbreviated as BD), a digital versatile disc (hereinafter, abbreviated as DVD), a compact disc (hereinafter, abbreviated as CD), or the like and/or to record information on such an optical disc.

FIG. 6 is a schematic view for explaining a configuration example of a conventional optical disc apparatus 100. The conventional optical disc apparatus 100 includes a housing 10, a disc tray 20 that is housed in the housing 10 so that it can be pulled out to outside the housing 10 (it can be pulled out in a direction indicated by a broken line arrow) and on which an optical disc is placed, and a traverse chassis 30 that is disposed on a lower portion side of the disc tray 20 as housed in the housing 10 and moves circularly in accordance with an operation of ejecting/retracting the disc tray 20.

The disc tray 20 is provided with an unshown disc placing portion so that an optical disc can be placed thereon. Furthermore, an unshown cutout is formed at part of a bottom surface of the disc tray 20. With this cutout provided, a space for disposing a turntable (not shown) mounted to a spindle motor 31 on the traverse chassis 30 is secured. Providing this cutout also makes it possible to irradiate an information recording surface of an optical disc with laser light emitted from an optical pickup 33 on the traverse chassis 30.

FIG. 7 is a schematic plan view showing a configuration example of the traverse chassis 30 included in the conventional optical disc apparatus 100. The traverse chassis 30 has various members mounted thereto, which are required to reproduce information on an optical disc or to record information on an optical disc.

On a front side F (a side to which the disc tray 20 is pulled out is assumed to be the front) on the traverse chassis 30, there is fixed the spindle motor 31 (see FIG. 6) to which a turntable 32 for holding an optical disc is mounted. Furthermore, on the traverse chassis 30, two guide shafts 34a and 34b in a state of being supported by a support base 38 are disposed parallel to a radial direction of an optical disc (a direction parallel to a direction in which the disc tray 20 is ejected/retracted). The optical pickup 33 that optically scans over the information recording surface of an optical disc is mounted so as to be slidable along these two guide shafts 34a and 34b.

The optical pickup 33 includes a light source (not shown) that emits laser light, objective lenses 331 and 332 that focus laser light emitted from the light source on the information recording surface of an optical disc, and a light receiving portion (not shown) that receives returned light reflected off the information recording surface and converts a light signal into an electric signal. The optical disc apparatus 100 is configured to have compatibility with BDs, DVDs, and CDs, and the optical pickup 33 is therefore provided with a BD optical system including the objective lens 331 for BDs and a DVD and CD optical system including the objective lens 332 for DVDs and CDs.

A stepping motor 35 is fixedly disposed on the traverse chassis 30, and a lead screw 36 is mounted to an output shaft of the stepping motor 35. A longitudinal direction of the lead screw 36 (a vertical direction in FIG. 7) is set to be parallel to the radial direction of an optical disc. A teeth member 37 mounted to the optical pickup 33 is engaged with the lead screw 36.

The teeth member 37 is provided with a biasing spring 37a and gear teeth 37b that are biased in a direction substantially orthogonal to the longitudinal direction of the lead screw 36 by the biasing spring 37a. The gear teeth 37b in a state of being pressed against a spiral groove 36a provided on the lead screw 36 bite into the groove 36a. By this configuration, the teeth member 37 converts the rotation of the lead screw 36 caused by the stepping motor 35 into a motion in a linear direction parallel to the longitudinal direction of the lead screw 36 (the radial direction of an optical disc) and transmits the motion to the optical pickup 33.

FIGS. 8A and 8B are views for explaining an operation of the conventional optical disc apparatus 100. FIG. 8A shows a state where the disc tray 20 has been pulled out from the housing 10, and FIG. 8B shows a state where the disc tray 20 with an optical disc 40 mounted thereon is housed in the housing 10.

As shown in FIG. 8A, when the disc tray 20 is pulled out for placing the optical disc 40 thereon, the traverse chassis 30 moves circularly around a back end portion B thereof such that a front end portion F thereof moves down. This circular movement is enabled by an unshown circular movement mechanism mounted to the traverse chassis 30. This circular movement mechanism is set to operate in conjunction with an ejecting/retracting mechanism that ejects/retracts the disc tray 20.

When the disc tray 20 with the optical disc 40 placed thereon is housed in the housing 10, the traverse chassis 30 moves circularly in a reverse direction to a direction in which it moves in a case where the disc tray 20 is pulled out. As a result of this, the front end portion F of the traverse chassis 30 rises from its lowered state and recovers to its original state before the pulling out of the disc tray 20 (a state shown in FIG. 8B). When the traverse chassis 30 rises, the turntable 32 comes in contact with an area of a lower surface of the optical disc 40 in the vicinity of a center thereof. The turntable 32 then rises further from that state and thereby holds the optical disc 40 in cooperation with a clamper 39 provided above the turntable 32. This allows the optical disc 40 to be rotated by the spindle motor 31.

In a case where the disc tray 20 is pulled out for taking out the optical disc 40, the turntable 32 is lowered below the disc tray 20, so that the optical disc 40 held by the turntable 32 is transferred onto the disc tray 20. The disc tray 20 in a state where this transfer has been completed is pulled out from the housing 10, and thus the optical disc 40 can be taken out.

By the way, as shown in FIG. 7, in order to secure electrical connection with a substrate outside the optical pickup 33, a flexible flat cable (FFC) 333 is attached to the optical pickup 33. The FFC 333 extends out from the optical pickup 33 toward an outer peripheral direction (this direction is expressed relative to the optical disc 40 and corresponds to a downward direction in FIG. 7).

FIG. 9 is a schematic view (a sectional view) for explaining the FFC 333 extending out from the optical pickup 33. As shown in FIG. 9, the FFC 333 extending out from the optical pickup 33 is bent in a curved state, and part thereof is disposed on a lower side of the traverse chassis 30. Since an opening 30a (see also FIG. 7) is formed at a center portion of the traverse chassis 30, the FFC 333 being bent does not interfere with the traverse chassis 30.

SUMMARY OF THE INVENTION

In response to the demand in recent years that the optical disc apparatus 100 be reduced in size, the trend has been toward reducing a size of the traverse chassis 30 in a longitudinal direction thereof (corresponding to the vertical direction in FIG. 7). This has made it difficult to sufficiently secure a distance d (see FIG. 7) between the FFC 333 extending out from the optical pickup 33 and the traverse chassis 30. As a result, in a case where the optical pickup 33 moves to an outer peripheral side, it is highly likely that the FFC 333 interferes with the traverse chassis 30. This brings up a fear that such interference might lead to problems such as a decrease in the durability of the FFC 333, the occurrence of a disconnection of the FFC 333, and so on.

In order to solve the problems such as a decrease in the durability of the FFC 333, the occurrence of a disconnection of the FFC 333, and so on, based on the technique disclosed in JP-A-2008-186560, there could be provided a protective piece for covering a corner edge portion ED on an inner side of the traverse chassis 30. Providing such a protective piece, however, is difficult from the viewpoint of the demand for a further size reduction of the optical disc apparatus 100.

In view of the foregoing, it is an object of the present invention to provide an optical disc apparatus that is unlikely to cause damage to a flexible member including wiring, which extends out from an optical pickup, and can be reduced in size.

In order to achieve the above-described object, an optical disc apparatus of the present invention has a configuration (a first configuration) including: a chassis; an optical pickup that is movably disposed on the chassis; a flexible member including wiring, which extends out from the optical pickup; and a wall portion that is provided in a standing manner at one end portion of the chassis. In the optical disc apparatus, an opening that allows the flexible member to be disposed in a bent state is formed through the chassis, and a first cutout is formed at the wall portion so as to be continuous with the opening.

According to this configuration, even in a case where the optical pickup moves toward a side of the wall portion, since the first cutout is formed at the wall portion so as to be continuous with the opening of the chassis, the flexible member extending out from the optical pickup is prevented from interfering with the chassis. Thus, the possibility of a decrease in the durability of the flexible member including wiring and the possibility of the occurrence of a disconnection thereof can be reduced.

Furthermore, despite the fact that an area of the chassis where the chassis might interfere with the flexible member is eliminated, the presence of the wall portion having a bridging structure (the wall portion having the first cutout) can suppress a decrease in the strength of the chassis. With the wall portion having the bridging structure adopted, the opening of the chassis can be structured to be continuous with one end of the chassis (that is, unnecessary thickness can be eliminated), and thus the length of the chassis (a length thereof in a direction in which the optical pickup moves) can be made shorter.

The above-described optical disc apparatus having the first configuration preferably has a configuration (a second configuration) in which the wall portion is formed by bending the chassis.

The above-described optical disc apparatus having the first or second configuration may adopt a configuration (a third configuration) further including a tray that is provided on an upper side of the optical pickup and on which an optical disc can be placed, in which a second cutout for avoiding interference with the tray is formed at an upper portion of the wall portion. This configuration can be said to be effective in a case where the optical disc apparatus needs to be reduced in thickness.

The above-described optical disc apparatus having any one of the first to third configurations may have a configuration (a fourth configuration) in which the flexible member is a flexible flat cable. As the flexible member, for example, a flexible flat cable (FFC), a flexible printed circuit (FPC), and the like can be used, in any of which cases the present invention is effective. The effectiveness of the present invention, however, is increased by the use of an FFC as the flexible member since, compared with an FPC, an FFC has lower durability against bending to which it is subjected when disposed in a curved state.

The above-described optical disc apparatus having any one of the first to fourth configurations may have a configuration further including: a holding portion that is rotatably provided on the chassis and holds an optical disc; and a guide portion that is provided on the chassis and guides the movement of the optical pickup, in which the holding portion is provided on a side of the other end portion on an opposite side to the one end portion at which the wall portion is provided.

As can be understood from the above, according to the present invention, an optical disc apparatus can be provided that is unlikely to cause damage to a flexible member including wiring, which extends out from an optical pickup, and can be reduced in size.

BRIEF DESCRIPTION OF DRAWINGS

FIG. 8A is a view for explaining an operation of the conventional optical disc apparatus, which shows a state where a disc tray has been pulled out from a housing.

FIG. 8B is a view for explaining the operation of the conventional optical disc apparatus, which shows a state where the disc tray with an optical disc mounted thereon is housed in the housing.

DETAILED DESCRIPTION OF PREFERRED EMBODIMENT

Figure 1:
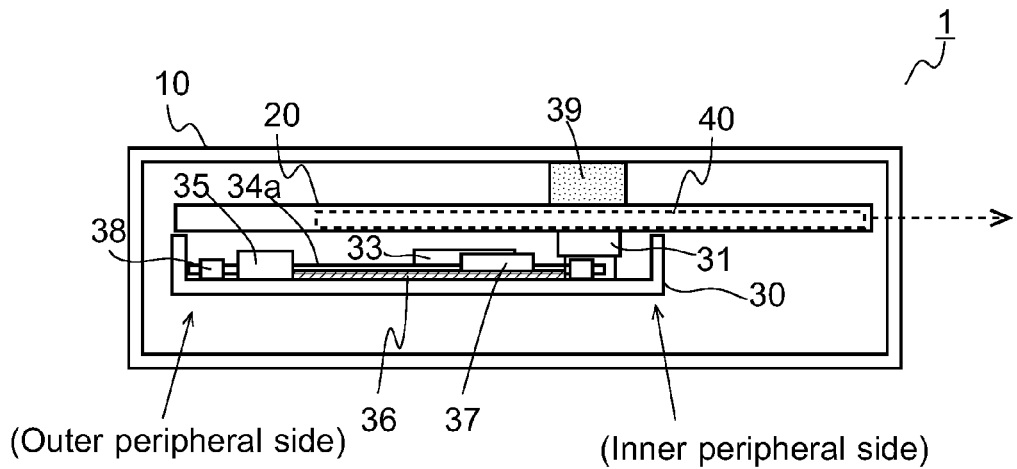
FIG. 1 is a schematic view for explaining a configuration of an optical disc apparatus of an embodiment of the present invention.

Hereinafter, an embodiment of an optical disc apparatus of the present invention will be described with reference to the appended drawings. FIG. 1 is a schematic view for explaining a configuration of an optical disc apparatus 1 of this embodiment. FIG. 1 shows a state where an optical disc 40 is mounted on a disc tray 20. Furthermore, in FIG. 1, a direction in which the disc tray 20 is pulled out to the outside is a rightward direction (a direction indicated by a broken line arrow). Furthermore, in FIG. 1, expressions "inner peripheral side" and "outer peripheral side" refer to respective sides relative to the optical disc 40. In the following description, terms "an inner periphery" and "an outer periphery" are used with similar intentions in mind.

Figure 6:
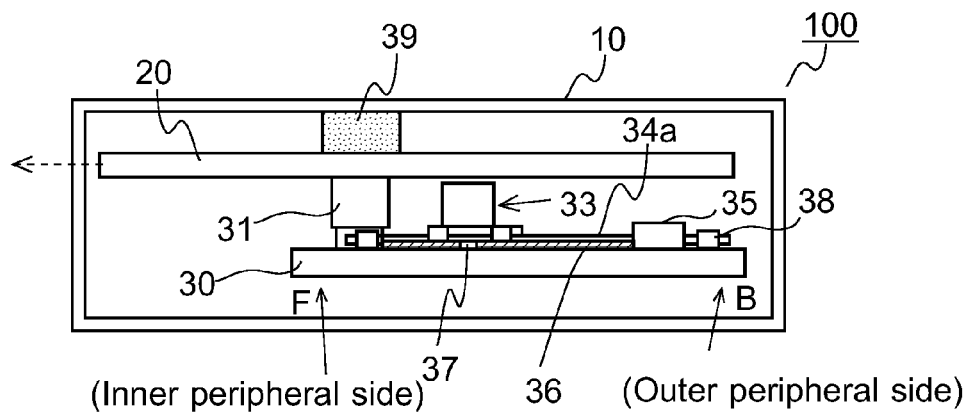
FIG. 6 is schematic view for explaining a configuration example of a conventional optical disc apparatus.

As shown in FIG. 1, the optical disc apparatus 1 has a configuration mainly including a housing 10, the disc tray 20, and a traverse chassis 30. The housing 10, the disc tray 20, and the traverse chassis 30 have respective configurations and functions similar in general to those in the foregoing conventional optical disc apparatus 100 (see FIG. 6, etc.). For this reason, parts identical to those in the conventional configuration are identified by the same reference symbols, and duplicate descriptions thereof are omitted unless particularly required.

Figure 7:
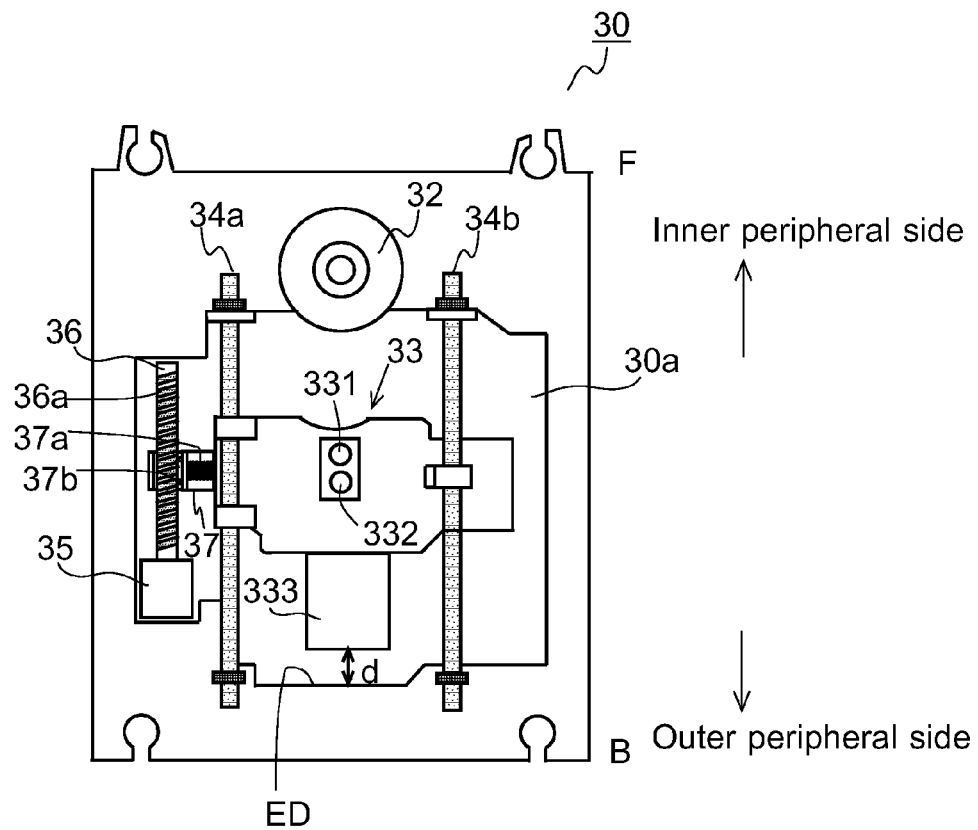
FIG. 7 is a schematic plan view showing a configuration example of a traverse chassis included in the conventional optical disc apparatus.
Figure 9:
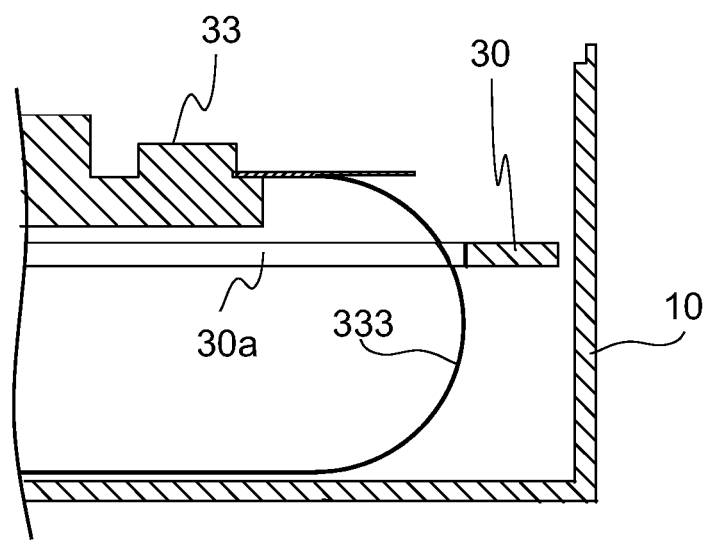
FIG. 9 is a schematic view for explaining an FFC extending out from an optical pickup.

A turntable 32 (see FIG. 7) is rotated by a spindle motor 31 mounted on the traverse chassis 30. The turntable 32 is provided on an inner peripheral side on the traverse chassis 30. The turntable 32 holds the optical disc 40 in cooperation with a clamper 39. The turntable 32 represents one example of a holding portion of the present invention. Furthermore, reading of information on the optical disc 40 rotated together with the turntable 32 and writing of information on the optical disc 40 are performed by an optical pickup 33 that is slidably held by guide shafts 34a and 34b. The guide shafts 34a and 34b (see also after-mentioned FIG. 3) each represent one example of a guide portion of the present invention.

The following describes the optical disc apparatus 1 of this embodiment with a particular focus on characteristic configurations thereof.

Figure 2:
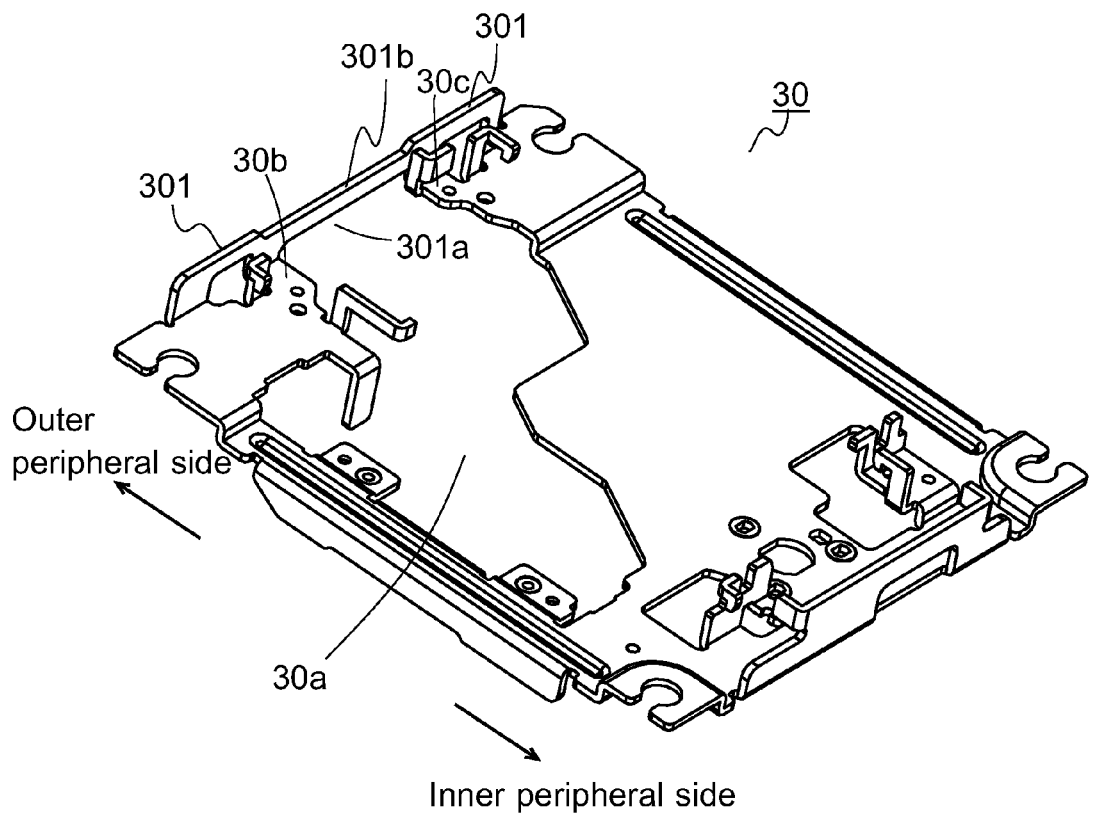
FIG. 2 is a schematic perspective view showing a configuration of a traverse chassis included in the optical disc apparatus of the embodiment of the present invention.

FIG. 2 is a schematic perspective view showing a configuration of the traverse chassis 30 included in the optical disc apparatus 1 of this embodiment. As shown in FIG. 2, an opening 30a required to permit the movement of the optical pickup 33 is formed through the traverse chassis 30 made of, for example, sheet metal.

Furthermore, at an end portion of the traverse chassis 30 on an outer peripheral side (an end portion corresponding to a direction in which the FFC 333 extends out from the optical pickup 33), a wall portion 301 is formed by bending one end of the traverse chassis 30 at a substantially right angle. On a lower portion side of the wall portion 301, a first cutout 301a is provided that has a substantially rectangular shape when the wall portion 301 is seen from a front side. The first cutout 301a is continuous with the opening 30a extending out to an outer peripheral end. The wall portion 301 provided in a standing manner at the outer peripheral end of the traverse chassis 30 therefore has a bridging structure that, on an outer peripheral end side, bridges portions 30b and 30c separated to the right and left by the opening 30.

Figure 3:
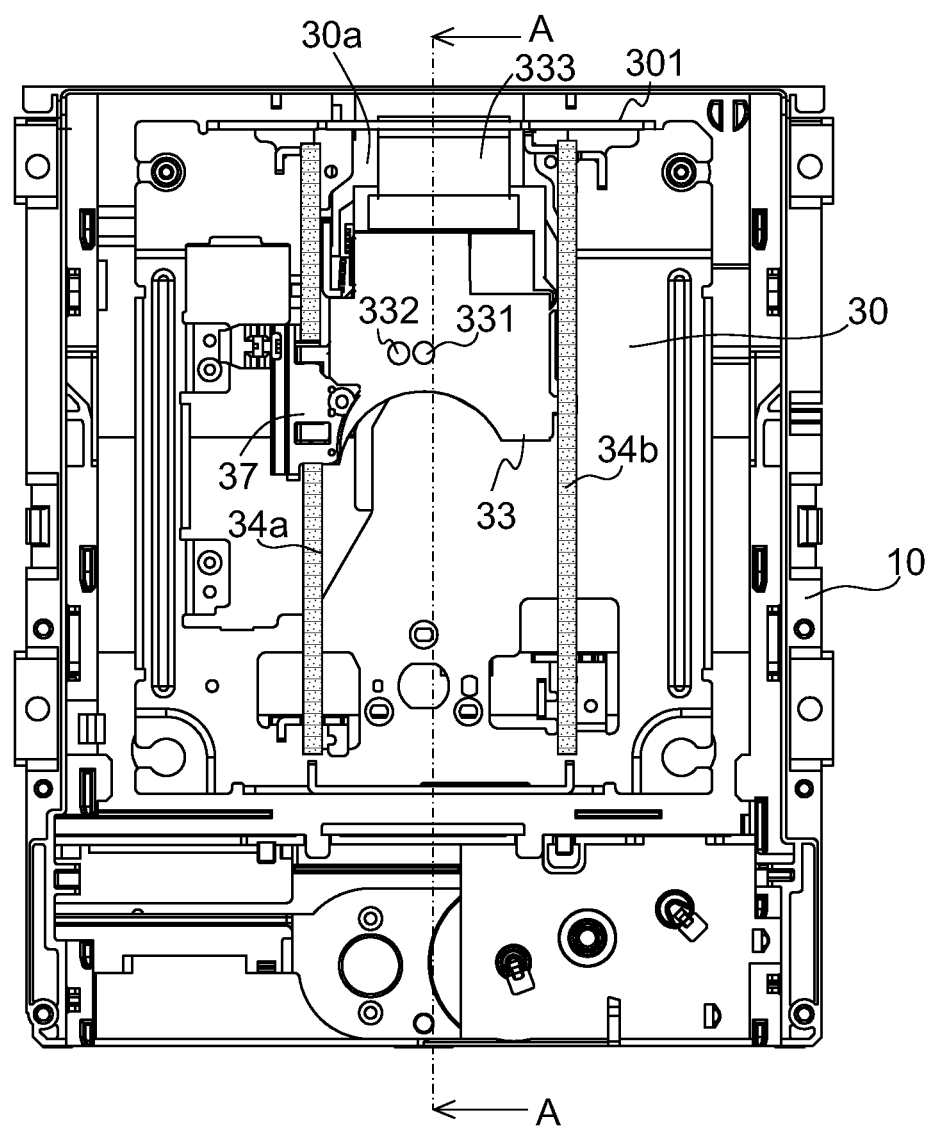
FIG. 3 is a schematic plan view as seen from above of the traverse chassis housed in a housing included in the optical disc apparatus of the embodiment of the present invention.
Figure 4:
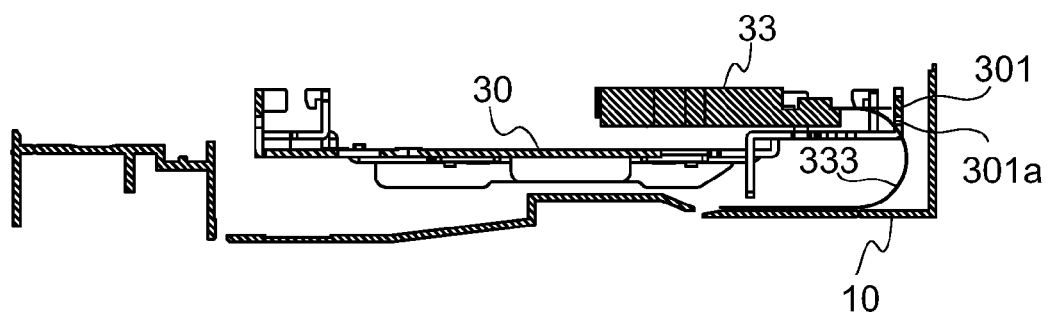
FIG. 4 is a schematic sectional view taken at a position of line A-A of FIG. 3.

Referring to FIGS. 3 and 4, the following describes an effect obtained by providing the wall portion 301 having the bridging structure. FIG. 3 is a schematic plan view as seen from above of the traverse chassis 30 housed in the housing 10 included in the optical disc apparatus 1 of this embodiment. In FIG. 3, it is assumed that the disc tray 20 and so on disposed on an upward side relative to the traverse chassis 30 are not present. Furthermore, FIG. 3 shows a state where the optical pickup 33 to which a teeth member 37 is mounted and the guide shafts 34a and 34b slidably holding the optical pickup 33 are mounted on the traverse chassis 30. In FIG. 3, the spindle motor 31 equipped with the turntable 32, a stepping motor 35 to which a lead screw 36 is mounted, and so on, which are mounted on the traverse chassis 30, are omitted. FIG. 4 is a schematic sectional view taken at a position of line A-A of FIG. 3.

The teeth member 37 has a configuration slightly different from that in the conventional optical disc apparatus 100. The teeth member 37, however, is no different therefrom in that it converts the rotation of the lead screw 36 (see FIG. 1) caused by the stepping motor 35 (see FIG. 1) into a motion in a linear direction parallel to a longitudinal direction of the lead screw 36 (a lateral direction in FIG. 1, a vertical direction in FIG. 3) and transmits the motion to the optical pickup 33.

As shown in FIG. 3, the FFC 333 extends out from the optical pickup 33 disposed on the traverse chassis 30. As shown in FIG. 4, due to the presence of the opening 30a formed through the traverse chassis 30, the FFC 333 is bent so as to be curved just before reaching the wall portion 301, and part thereof is disposed between the traverse chassis 30 and the housing 10. The FFC 333 represents one example of a flexible member including wiring of the present invention. Furthermore, the opening 30a represents one example of an opening that allows the flexible member extending out from an optical pickup to be disposed in a bent state.

As the optical pickup 33 moves to the outer peripheral side, as shown in FIGS. 3 and 4, the FFC 333 extracted from the optical pickup 33 approaches the wall portion 301 of the traverse chassis 33. At the wall portion 301, however, there is formed the first cutout 301a. As shown in FIG. 4, this prevents the curved FFC 333 from interfering with the traverse chassis 30. Thus, in the optical disc apparatus 1, the possibility of a decrease in the durability of the FFC 333 and the possibility of the occurrence of a disconnection thereof are reduced.

On the other hand, despite the fact that an area of the traverse chassis 30 where the traverse chassis 30 might interfere with the FFC 333 is eliminated as described above, the presence of the wall portion 301 having the bridging structure suppresses a decrease in the strength of the traverse chassis 30. With the wall portion 301 having the bridging structure adopted, the opening 30a can be structured to be continuous with the outer peripheral end of the traverse chassis 30 (that is, unnecessary thickness can be eliminated), and thus the length of the traverse chassis 30 (a length thereof in a direction in which the optical pickup 33 moves) can be made shorter. That is, the optical disc apparatus 1 is structured such that a size reduction thereof can be achieved by reducing a size thereof in a direction in which the optical disc 40 is ejected/retracted (the lateral direction in FIG. 1, the vertical direction in FIG. 3).

Figure 5:
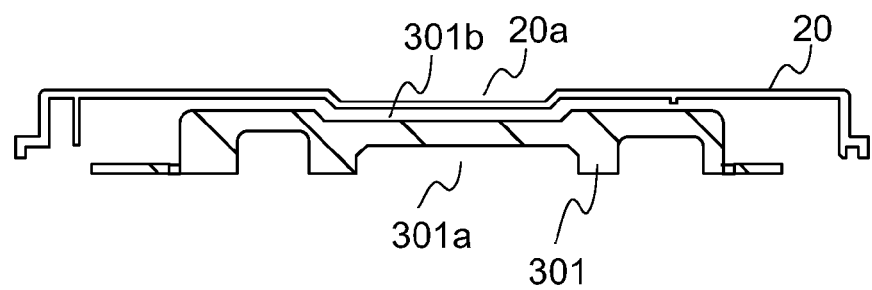
FIG. 5 is a schematic view showing a relationship between a disc tray included in the optical disc apparatus and a wall portion provided on the traverse chassis in the embodiment of the present invention.

Referring back to FIG. 2, at a position in an upper portion of the wall portion 301 provided on the traverse chassis 30 close to a center of the wall portion 301, a second cutout 301b is formed that has a substantial trapezoidal shape when the wall portion 301 is seen from the front side. Referring to FIG. 5, the following describes an effect obtained by providing the second cutout 301b. FIG. 5 is a schematic view showing a relationship between the disc tray 20 included in the optical disc apparatus 1 and the wall portion 301 provided on the traverse chassis 30 in this embodiment. FIG. 5 is a view of the disc tray 20 and the traverse chassis 30 when seen along a direction in which the disc tray 20 is ejected/retracted.

In the disc tray 20, as shown in FIG. 5, a concave portion 20a is formed on an opposite side to a side to which the disc tray 20 is pulled out (a left end side in FIG. 1). The concave portion 20a is provided for the purpose of avoiding interference between the disc tray 20 that is ejected/retracted with respect to the housing 10 and the clamper 39 provided at an upper portion of the housing 10. Since the concave portion 20*a* is present, the disc tray 20 is structured such that part thereof protrudes to a lower side.

The second cutout 301*b* provided at the wall portion 301 having the bridging structure is formed so as to correspond to this protruding structure. That is, thanks to the second cutout 301*b*, interference between the disc tray 20 and the traverse chassis 30 (the wall portion 301) is avoided. This configuration is effective in reducing the thickness of the optical disc apparatus 1.

Needless to say, the foregoing embodiment is merely illustrative of an optical disc apparatus to which the present invention is applied and not intended to limit a configuration of an optical disc apparatus to which the present invention is applied to the configuration of the foregoing embodiment.

For example, in the configuration of the foregoing embodiment, the FFC 333 extends out from the optical pickup 33. The scope to which the present invention is applicable, however, is not limited to this configuration. There may be adopted a configuration in which, instead of an FFC, a flexible printed circuit (FPC) extends out from the optical pickup 33, and the present invention is applicable also to such a configuration. Hence, an FPC also represents one example of the flexible member including wiring of the present invention.

Furthermore, in the configuration of the foregoing embodiment, the second cutout 301*b* is provided at the wall portion 301 having the bridging structure. The second cutout 301*b*, however, is not essential and may be omitted as long as the disc tray 20 does not interfere with the traverse chassis 30 (the wall portion 301).

In addition to the above, in the configuration of the foregoing embodiment, the optical pickup 33 includes two objective lenses 331 and 332. The scope to which the present invention is applicable, however, is not limited to this configuration. That is, the present invention is applicable regardless of the number of objective lenses included in an optical pickup. Furthermore, naturally, the present invention is applicable also to optical disc apparatuses that can perform reproduction and/or recording of information with respect to optical discs of types other than BDs, DVDs, and CDs.

The present invention can achieve a size reduction of an optical disc apparatus that performs reproduction and/or recording with respect to an optical disc and thus is a technique useful for optical disc apparatuses.

What is claimed is:

1. An optical disc apparatus, comprising:
    a chassis;
    an optical pickup that is movably disposed on the chassis;
    a wall portion that is provided in a standing manner at one end portion of the chassis; and
    a flexible member including wiring, which extends out from the optical pickup and is bent before reaching the wall portion;
    wherein
    an opening that allows a part of the flexible member, which is turned back by the bending, to be disposed below the chassis is formed through a bottom surface of the chassis,
    the wall portion includes a first cutout portion formed by cutting out a part of said wall portion, and
    as a result of the first cutout portion and the opening being continuous with each other, the wall portion has an bridging structure.

2. The optical disc apparatus according to claim 1, wherein the wall portion is formed by bending one end of the chassis in a longitudinal direction.

3. The optical disc apparatus according to claim 1, further comprising:
    a tray that is provided on an upper side of the optical pickup and on which an optical disc can be placed,
    wherein a second cutout for avoiding interference with the tray is formed at an upper portion of the wall portion.

4. The optical disc apparatus according to claim 1, wherein the flexible member is a flexible flat cable.

5. The optical disc apparatus according to claim 1, further comprising:
    a holding portion that is rotatably provided on the chassis and holds an optical disc; and
    a guide portion that is provided on the chassis and guides movement of the optical pickup,
    wherein the holding portion is provided on a side of an other end portion on an opposite side to the one end portion at which the wall portion is provided.

* * * * *